United States Patent Office 2,773,844
Patented Dec. 11, 1956

2,773,844

METHOD FOR MAKING SUPPORTED SILVER CATALYSTS

George J. Carlson and Clarence R. Gum, Berkeley, Calif., assignors to Shell Development Company, Emeryville, Calif., a corporation of Delaware No Drawing. Application June 12, 1953,
Serial No. 361,416

4 Claims. (Cl. 252—463)

This invention relates to supported silver catalysts. The invention relates more particularly to supported silver catalysts of improved activity particularly effective in the oxidation of olefinic hydrocarbons.

Metallic silver functions as a catalyst for many chemical reactions. In a number of processes the silver is employed in finely divided form deposited upon a suitable support. Efficient catalysts of this type have heretofore been produced by impregnating a suitable support with a reducible silver compound and reducing the compound. Ability to carry out a process economically on a large scale with the aid of such catalysts is often dependent not only upon their activity but also upon the quantity of silver required. Though the amount of silver contained in an impregnated type catalyst as prepared heretofore is generally relatively low in comparison with catalysts consisting essentially, or predominantly, of silver such as the massive silver type catalysts, this amount is nevertheless often sufficiently high to detract materially from full realization of advantages otherwise inherent in its use.

Methods used heretofore to obtain an impregnated catalyst involved the impregnation of a support with a sufficient quantity of a reducible silver compound by one or several impregnations before subjecting the impregnated support to conditions resulting in a reduction of the compound to metallic silver. Attempts to obtain a supported catalyst of greater activity by increasing the silver content thereof prior to the initial silver reduction step, generally resulted in catalysts of relatively high cost due to the amount of silver used. A substantial amount of such silver was often present in relatively inactive form. Other means resorted to heretofore to obtain impregnated silver catalysts of high activity comprise the activation of the prepared catalyst by chemical treatment. The cost of the additional manipulative steps and the inherent operational disadvantages thereof, such as equipment corrosion, generally offset any advantage obtained by such treatments.

It is an object of the present invention to provide an improved supported silver catalyst of high activity obviating to at least a substantial degree disadvantages often inherent in supported silver catalysts prepared by methods generally employed heretofore.

Another object of the invention is the provision of improved supported silver catalysts of substantially decreased silver content but which nevertheless display increased activity.

An object of the invention is the provision of a method enabling the production of improved silver catalysts of decreased silver content possessing substantially increased activity.

A still further object of the invention is the provision of an improved supported silver catalyst particularly effective in the oxidation of olefinic hydrocarbons.

A particular object of the invention is the provision of an improved catalyst possessing high activity and selectivity in the oxidation of ethylene-containing hydrocarbons to products comprising ethylene oxide. Other objects and advantages of the invention will become apparent from the following detailed description thereof.

In accordance with the present invention improved supported silver catalysts of substantially increased activity are obtained by the method of catalyst preparation comprising the consecutive steps of depositing a reducible silver compound upon a suitable support, the reducing of the silver compound on the support to metallic silver, and the repeating at least once of the complete cycle of silver compound deposition and silver compound reduction. Essential to the attainment of the objects of the invention is the execution of a second impregnation of the silver-containing support after at least a substantial part of the initially deposited reducible silver compound has been reduced to metallic silver.

It has been found that whereas deposition of the total amount of silver upon the support in the form of a reducible silver compound before subjection of the impregnated support to reducing conditions results in a supported catalyst in which the finely divided silver is unevenly distributed over the surface of the support and often in agglomerated form, the preparation of the catalyst in accordance with the present invention results in a catalyst containing the finely divided metallic silver distributed throughout the surface of the support with an unusual degree of uniformity.

It has been found that for a given silver content catalysts which are more active, and which are more selective, in the olefin oxidation reaction, are obtained by performing at least twice the complete cycle consisting of the consecutive steps of impregnating the support with a silver compound and reducing the compound to metallic silver.

Supports, or supporting materials, employed in the production of supported silver catalysts in accordance with the invention comprise any of the solid supports heretofore employed in catalyst preparation. The support material may be completely inert or it may be one having a promoting or synergistic effect upon the finely divided metallic silver. Suitable supports comprise, for example: naturally occurring materials such as clays, bauxite, dawsonite, Florida earth, bentonite, kaolin, montmorillonite, green sand, the zeolites, diatomaceous earth, kieselguhr, infusorial earth, etc.; treated clay and clay-like materials; artifically prepared materials, such as, permutites, activated alumina, silica gel, charcoal, and the like; highly porous substances such as activated carbon, pumice, etc.; highly refractory materials such as fused aluminum oxide, refractory Alundum, tabular corundum, silicon carbide, silica, crushed brick, magnesia, etc. Of the available catalyst support materials those consisting essentially of a porous structure are preferred. Catalysts possessing particularly desired characteristics are obtained by the use as the support of materials possessing adsorbent properties. The support material may be subjected to any conventional pretreatments directed to its activation, stabilization or to improving its characteristics.

A silver-containing compound providing the source of the metallic silver content of the finished catalyst is deposited upon the support. Suitable silver compounds comprise the silver compounds capable of conversion to metallic silver by subjection of the supported compound to suitable reducing conditions. Such silver compounds comprise, for example, those which are reduced to metallic silver when subjected to an elevated temperature in a reducing atmosphere, as in the presence of a reducing gas such as a hydrogen-containing gas. Suitable compounds comprise, for example: the salts of silver and a strong mineral acid such as, for example, silver nitrate; the salts of silver and an organic acid such as the silver salts of aliphatic carboxylic acids exemplified by formic, acetic, propionic, butyric, isobutyric, valeric, oxalic, malonic, lactic acids and the like.

The particular method employed to deposit the silver-containing compound upon the support will depend to some extent upon the particular silver compound employed. The silver compound may be deposited upon the support by bringing the solid catalyst support into contact with a dispersion, solution, or suspension of the silver compound in a suitable carrying medium. The carrying medium may comprise, for example, a normally gaseous or normally liquid material wherein the compound is dispersed. Thus, the carrier material may be contacted with a gaseous stream containing suspended particles of the silver compound. In a preferred method of preparing the catalysts of the invention the carrier material is contacted with a solution of the silver compound in a suitable solvent. Essential to the attainment of the improved catalysts of the invention, however, is the initial deposition of an amount of silver compound upon the catalyst support material capable of providing only a fraction of the total amount of metallic silver intended to be contained in the desired finished catalyst.

The catalyst carrier containing the deposited silver compound in an amount which is sufficient to provide only a fraction of the requisite final silver content of the catalyst is thereafter subjected to conditions resulting in the conversion of deposited silver compound to metallic silver. Conditions employed to convert the deposited silver compound to metallic silver comprise those disclosed heretofore. The specific method of reduction to be preferred will depend to some extent upon the specific silver compound deposited upon the support. A compound readily decomposed thermally to reaction products comprising metallic silver such as certain organic silver compounds may be heated at an elevated temperature capable of decomposing the deposited silver compound to metallic silver in the presence or absence of suitable gaseous agents. Suitable gaseous agents which may be employed comprise gases such as steam, nitrogen, etc. A preferred method of reducing the deposited silver compounds comprises the subjection of the supported silver compound to a reducing atmosphere at an elevated temperature in the presence of hydrogen or a hydrogen-containing gas.

After reducing at least a substantial part of the silver compound upon the support to products comprising metallic silver, the resulting metallic silver-containing composition is cooled. A further quantity of reducible silver compound in an amount not exceeding that providing the desired amount of metallic silver in the finished catalyst is then deposited upon the metallic silver-containing composition. The additionally deposited silver compound is thereupon reduced to products comprising metallic silver.

The complete cycle of deposition of silver compound upon the support, followed by reduction to metallic silver, is repeated until the desired amount of metallic silver is obtained in the finished product. Essential to the obtaining of the objects of the invention is the initial deposition upon the support of silver compound in an amount insufficient to provide the total amount of metallic silver desired in the finished catalyst. The deposition of the total amount of silver must be obtained by a procedure involving a performance of at least twice the complete cycle consisting of the successive steps of silver compound deposition and silver compound reduction. It has been found that catalyst preparation involving two consecutive cycles of impregnation-reduction, results in the obtaining of highly active catalysts of reduced silver content. Methods involving a greater number of such repeated complete cycles each consisting of impregnation followed by reduction may, however, be resorted to within the scope of the invention.

Methods involving the preparation of the catalyst may vary to some extent within the scope of the invention as apparent to one skilled in the art. Thus, the impregnated catalyst support may be subjected to a drying operation prior to impregnation by means comprising one or more such steps as, for example, air-drying, heating at an elevated temperature in the absence of air and optionally in the presence of an inert gas such as, for example, nitrogen. The dried impregnated support may be cooled, by means comprising one or more such steps as air-cooling at ambient conditions, cooling in the presence of an inert gas stream, such as, for example, nitrogen, etc., before being subjected to the reducing conditions. The gaseous stream employed in the cooling operation may be recycled. The reduced catalyst may be cooled by means comprising one or more such steps as those defined hereinbefore for the cooling of the impregnated catalyst support.

In a preferred method of preparing the catalysts of the invention the reducible silver compound is combined with the solid support in the form of a solution in a suitable solvent. Thus, silver may be deposited upon an aluminous adsorptive material by impregnation of the aluminous material with an aqueous solution of silver nitrate. Impregnation of the support is executed at room temperature or at a moderately elevated temperature such as, for example, a temperature in the range of from about 20 to about 95° C. The impregnated support is preferably dried prior to reduction. Suitable drying temperatures comprise those in the range of, for example, from about 110 to about 300° C., and preferably from about 130 to about 170° C. Reduction of the dried impregnated support is preferably executed by heating in a reducing atmosphere, for example, in the presence of a gaseous stream comprising hydrogen, at a temperature in the range of from about 150 to about 400° C., and preferably from about 200 to about 325° C.

Reduction of the supported silver compound may be carried out by first heating the composition at a temperature in the range of from about 170 to about 270° C. in an atmosphere consisting essentially of an inert gas, such as, for example, nitrogen. Thereafter, when substantially the entire mass of the composition has been brought to this temperature the heating is continued in the presence of a hydrogen-containing gas, for example, a mixture of hydrogen and steam. The heating is continued at a temperature in the range of from about 200 to about 325° C. until substantially all of the silver compound has been reduced to reaction products comprising metallic silver. If desired the hydrogen employed during the reduction step may be diluted with nitrogen and recycling of gaseous effluent from the reducing zone resorted to. The following example is illustrative of the preparation of the silver catalysts of improved activity in accordance with the process of the invention.

EXAMPLE I

A silver catalyst "A" containing 4.8% by weight of finely divided metallic silver was prepared by impregnating a pelleted alumina support (Alundum) with a 15.2% by weight aqueous solution of silver nitrate at 25° C. The resulting impregnated material was dried in air at 110–120° C. and then heated at 300° C. in a stream of nitrogen. Thereafter it was cooled to 230° C. and finally heated in a stream of hydrogen and nitrogen at a temperature of about 260° C. until substantially all of the supported silver nitrate was reduced to reaction products comprising a finely divided metallic silver deposit. The resulting silver metal-containing catalyst was cooled. The finished catalyst was found to contain 2.4% by weight of finely divided metallic silver.

An additional amount of finely divided metallic silver was deposited upon the metallic silver-containing catalyst thus obtained by repeating again the complete cycle of impregnation with aqueous silver nitrate, drying, and reduction of deposited silver nitrate under substantially identical conditions as employed in the first cycle of impregnation and reduction. Aqueous silver nitrate containing 15.2% by weight silver nitrate was used for the impregnation in the second cycle in an amount sufficient to result in a final reduced silver catalyst having a metallic silver content of 4.8% by weight. The catalyst thus prepared by a two-stage impregnation-reduction was observed to contain the metallic silver as a distribution of unusual uniformity throughout the surface of the porous, aluminous support.

For the purpose of comparison a second catalyst "B" having a metallic silver content of 5.3% by weight was prepared by repeating under substantially identical conditions the first complete cycle of impregnation and reduction as described in the foregoing description of the preparation of catalyst "A" with the exception that a 30.0% by weight aqueous solution of silver nitrate was used in sufficient amount to result, by a single impregnation, in the deposition of sufficient silver nitrate to yield upon reduction a finished catalyst containing 5.3% by weight of metallic silver.

For further comparison a third catalyst "C" containing 12.8% by weight of metallic silver was prepared by single stage impregnation followed by reduction under substantially identical conditions as described in the foregoing description of the preparation of catalyst "B" with the exception that a 56.7% by weight aqueous solution of silver nitrate was employed in sufficient amount to provide by the single impregnation a deposition of sufficient silver nitrate to produce upon subsequent reduction a catalyst containing 12.8% by weight of metallic silver.

The catalysts of the present invention are employed with advantage in catalytic processes wherein silver catalysts have been employed heretofore. They are used with particular advantage as catalysts in the direct oxidation of olefin hydrocarbons, such as, for example, ethylene, with molecular oxygen to the corresponding olefin oxides. In the production of ethylene oxide ethylene is contacted with oxygen-containing gas in the presence of the silver-containing catalyst in a reaction zone at a temperature in the range of from about 150° C. to about 400° C., and preferably in the range of from about 200° C. to about 325° C. Although it is preferred to carry out the process of the invention at about atmospheric pressure, subatmospheric or superatmospheric pressures up to, for example, about 500 p. s. i. g., may be employed.

Ethylene to be oxidized with the aid of the catalysts of the invention need not necessarily be essentially pure ethylene and may comprise normally gaseous diluents which have no substantial adverse effect upon catalyst activity. The ethylene normally charged may comprise gaseous constituents generally encountered in readily available ethylene, such as, for example, minor amounts of normally gaseous hydrocarbons other than ethylene. The oxygen may be employed in the form of relatively pure oxygen or as an oxygen-containing, normally gaseous material providing molecular oxygen for the reaction, such as, for example, air. Normally gaseous materials, such as, for example, nitrogen, oxides of carbon, etc., as well as water, may be comprised in varying amounts in the charge to the oxidation.

The composition of the feed may vary considerably within relatively wide limits. Ethylene concentrations from about 2 to about 20% may be employed to obtain a feed composition containing an amount of oxygen which is less than, equal to, or in excess of that which is theoretically required for the oxidation of the ethylene component of the charge. In general, an oxygen concentration in the feed stream in the range of from about 5 to about 20% is satisfactory. In general, it is preferred to maintain the oxygen concentration at or below about 9%, or below the minimum amount capable of forming flammable mixtures at the conditions of operation.

The substantial superiority of the catalysts of the invention in the molecular oxidation of ethylene to ethylene oxide is shown by the ability to obtain with their use ethylene oxide yields which are substantially equal to those obtained with catalysts containing twice as much silver prepared by methods generally employed heretofore. This is evidenced by the following examples:

EXAMPLE II

In an operation, 1, a gaseous stream containing 15 mol percent ethylene, 9 mol percent oxygen, 5 mol percent carbon dioxide, 3 mol percent ethane, and 0.7 mol percent water, the balance consisting essentially of nitrogen, was passed through a 12 foot steel tubular reactor containing 2,000 cc. of the catalyst, identified as "A" in the foregoing Example I, containing 4.8% by weight silver and prepared by the two-stage impregnation-reduction cycle in accordance with the invention. Passage of the normally gaseous feed through the reactor was controlled to obtain an apparent contact time of about 12 seconds. A pressure of about 115 p. s. i. g. was maintained in the reactor. The tubular reactor was jacketed and a mineral oil temperature controlling medium was circulated through the jacket at a controlled rate to maintain the temperature therein at 252° C. Ethylene dichloride in the amount of 6 molar parts per million based on the total gaseous feed was introduced as a promoter into the reactor during the course of the operation. Under these conditions there was obtained an ethylene oxide yield of 69.0%.

In an operation, 2, the foregoing ethylene oxidation operation was repeated under substantially identical conditions but with the exception that the catalyst identified by the designation "C" in the foregoing Example I, containing 12.8% silver, and prepared by single stage impregnation-reduction, was substituted for the 4.8% silver catalyst identified by the designation "A." With the use of the catalyst "C" there was obtained an ethylene oxide yield of 69.7%.

In a third operation, 3, the foregoing ethylene oxidation was again repeated under substantially identical conditions as those employed in operations 1 and 2 with the exception that the catalyst identified by the designation "B" containing 5.3% silver the preparation of which by the prior art single impregnation-reduction cycle was set forth in foregoing Example I, was substituted for the catalyst "A" or "C." At the oil jacket temperature of 252° C. the conversion of ethylene was so low that it was incompatible with economic practical scale operation. The oil jacket temperature was increased to as high as 274° C. Even so, the maximum ethylene oxide yield did not exceed 63%.

It is thus seen from the foregoing example that the catalysts of the present invention enable the obtaining of substantially equivalent yields of ethylene oxide with the use of only one half the amount of metallic silver required when using catalysts prepared by the prior art, and that such equivalent yields are obtained without the need for any substantial change in essential operating conditions.

An essential criterion to efficient operation in the silver-catalyzed oxidation of ethylene to ethylene oxide is the maximum catalyst bed temperature increase encountered in the catalyst bed during the operation. As evidenced by the following example, the catalysts of the present invention enable the obtaining of increased ethylene oxide production rates over those obtained with silver catalysts of the prior art containing substantially more silver at substantially equal increases in maximum catalyst bed temperatures. This substantial improvement in production rate is obtained as considerably more economical operating conditions.

EXAMPLE III

A catalyst "D" containing 4.8% by weight of finely divided silver upon an alumina (Alundum) support was prepared by the two-stage impregnation-reduction method of the present invention under the conditions set forth for the preparation of catalyst "A" of the foregoing Example I. A catalyst "E" containing 5.3% by weight of metallic silver upon an alumina support (Alundum) was prepared by the prior art single-stage impregnation-reduction method under the conditions employed in preparation of catalyst "B" of Example I.

In two parallel, distinct and separate operations ethylene was oxidized to ethylene oxide under the ethylene oxidizing conditions set forth in the foregoing Example II with the exception that catalyst "E" was employed as the catalyst in one of the parallel operations and catalyst "D" was employed as the catalyst in the other operation. The results obtained in each of the operations in terms of ethylene oxide yield and ethylene oxide production rate, as well as the oil jacket temperature and maximum catalyst bed temperature for each of the two operations are indicated in the following table.

Table I

| Catalyst | Method of Preparation | Oil Temperature in Jacket, °C. | Max. Temp. Increase in Catalyst Bed, °C. | Ethylene Oxide Yield | Ethylene Oxide Production Rate, lbs. EO/hr./cu. ft. |
|---|---|---|---|---|---|
| D | Two stage | 253 | 18 | 68 | 2.72 |
| E | One stage | 274 | 17 | 64.5 | 2.19 |

The catalysts of the invention have brought within the realm of practicability the use of low silver content catalysts in the practical scale production of olefin oxides, such as, ethylene oxide, from the corresponding olefinic hydrocarbons.

EXAMPLE IV

A catalyst "F" containing 9.6% of finely divided metallic silver upon an alumina (Alundum) support was prepared by the two-stage impregnation-reduction method of the present invention under the conditions substantially identical to those employed in the preparation of the catalyst "A" of the foregoing Example I.

Another catalyst "G" containing 12.8% finely divided metallic silver upon an alumina support (Alundum) was prepared by the prior art method of a single stage impregnation-reduction under conditions set forth in the foregoing Example I for the preparation of the catalyst "C."

In two separate, parallel operations ethylene was oxidized to ethylene oxide under substantially the same ethylene oxidizing conditions set forth in the foregoing Example II with the exception that catalyst "F" was employed in one of the operations and catalyst "G" in the other, and with the further exception that 0.3 part per million of chlorinated polyphenyls were added as promoter to the charge. The ethylene oxide yield and ethylene oxide production rate, as well as the temperature maintained in the oil jacket of the reactor, for each of the two parallel operations are indicated in the following table:

| Catalyst | Method of Preparation | Oil Temperature in Jacket | Ethylene Oxide Yield | Ethylene Oxide Rate, lbs. EO/hr/ cu. ft. |
|---|---|---|---|---|
| F | Two stage | 244 | 68.9 | 3.38 |
| G | One stage | 256 | 69.7 | 2.75 |

The invention claimed is:

1. In the process for the production of a silver catalyst composition wherein aqueous silver nitrate is combined with an inert porous solid support in a total amount which upon reduction provides a concentration of from about 2 to about 15% by weight of metallic silver in said catalyst composition, and said silver nitrate is reduced to metallic silver on said support, the steps which comprise combining with said support only a fraction of said total amount of said aqueous silver nitrate, reducing said silver nitrate combined with said support to metallic silver by heating at a temperature of from about 150 to about 400° C. in a reducing atmosphere, combining the resulting silver metal-containing composition with the remainder of said total amount of said aqueous silver nitrate, and reducing said silver nitrate additionally combined with said silver metal-containing support to metallic silver by again heating at a temperature of from about 150 to about 400° C. in a reducing atmosphere, thereby obtaining a silver catalyst containing from 2 to 15% metallic silver having a greater activity for the ethylene oxidation reaction than a similar catalyst containing the same amount of silver prepared by reducing silver nitrate upon the support but in the absence of a reduction of a part of the silver nitrate to elemental silver before a subsequent impregnation with a further amount of silver nitrate.

2. In the process for the production of a silver catalyst composition wherein a salt of silver with an acid of the group consisting of nitric acid and aliphatic carboxylic acids are combined with an inert solid porous support in an amount which upon reduction provides a concentration of metallic silver in said catalyst composition which is sufficient to promote the oxidation of olefins to olefin oxides, and said silver salt is reduced to metallic silver on said support, the improvement which comprises combining only a fractional part of said amount of said silver salt with said support in each of a plurality of separated steps, and reducing at least a substantial part of said silver salt on said support to elemental silver after each of said separate steps by heating at a temperature in the range of from about 150 to about 400° C., thereby obtaining a silver catalyst having greater activity for the olefin oxidation reaction than a similar catalyst prepared by reducing an equal amount of said silver salt upon said support but in the absence of a reduction of a part of said silver salt to elemental silver before a subsequent impregnation with a further amount of said silver salt.

3. The process in accordance with claim 1, wherein said solid support is a finely divided solid absorbent.

4. The process in accordance with claim 1 wherein said solid support is adsorptive alumina.

References Cited in the file of this patent

UNITED STATES PATENTS

| | | |
|---|---|---|
| 2,020,411 | Greer | Nov. 12, 1935 |
| 2,125,333 | Carter | Aug. 2, 1938 |
| 2,592,016 | Engel | Apr. 8, 1952 |